(12) United States Patent
Jamuna (10) Patent No.: US 10,718,317 B2
(45) Date of Patent: Jul. 21, 2020

(54) WIND TURBINE BLADE SURFACE TREATMENT APPARATUS

(71) Applicant: Vestas Wind Systems A/S, Aarhus N. (DK)

(72) Inventor: Karthik Krishnan Jamuna, Trivandrum (IN)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/766,471

(22) PCT Filed: Oct. 6, 2016

(86) PCT No.: PCT/DK2016/050322
§ 371 (c)(1),
(2) Date: Apr. 6, 2018

(87) PCT Pub. No.: WO2017/059865
PCT Pub. Date: Apr. 13, 2017

(65) Prior Publication Data
US 2019/0085828 A1    Mar. 21, 2019

(30) Foreign Application Priority Data
Oct. 9, 2016    (DK) .................. 2015 70639

(51) Int. Cl.
*B08B 3/02*    (2006.01)
*F03D 80/55*    (2016.01)
(Continued)

(52) U.S. Cl.
CPC ............... *F03D 80/55* (2016.05); *B08B 3/02* (2013.01); *B08B 3/024* (2013.01); *B08B 13/00* (2013.01); *B08B 17/025* (2013.01); *Y02E 10/726* (2013.01)

(58) Field of Classification Search
CPC .......... F03D 80/55; B08B 3/02; B08B 3/024; B08B 13/00; B08B 17/025; Y02E 10/726
See application file for complete search history.

(56) References Cited

U.S. PATENT DOCUMENTS

2006/0251505 A1* 11/2006 Ferguson ............... F03D 3/002
                                                             415/4.1
2010/0132738 A1    6/2010 Kumar et al.
(Continued)

FOREIGN PATENT DOCUMENTS

CN    201024717 Y    2/2008
CN    103397804 A    11/2013
(Continued)

OTHER PUBLICATIONS

Danish Patent and Trademark Office, Examination and Search Report in PA 2015 70639, dated May 9, 2016.
(Continued)

*Primary Examiner* — Sharidan Carrillo
(74) *Attorney, Agent, or Firm* — Wood Herron & Evans LLP (57) ABSTRACT

Apparatus for treating a surface of a wind turbine blade (14), comprising an expandable structure (22) that is deployable from a collapsed state into an expanded state in which the structure defines an elongated treatment zone (32) into which a blade (14) is receivable in use. The apparatus includes treating means (52) arranged to apply a treatment in the treatment zone. Also provided is a method for treating a wind turbine blade (14) including: positioning a wind turbine blade in a substantially vertical orientation; locating an expandable structure (22) adjacent the wind turbine blade; deploying the expandable structure (22) about the blade (14) such that the expandable structure (22) defines an elongated treatment zone (32) which receives at least part of the blade
(Continued)

(14); and applying surface treatment to the surface of the blade (14) using the expandable structure (22).

7 Claims, 9 Drawing Sheets

(51) Int. Cl.
    *B08B 17/02*      (2006.01)
    *B08B 13/00*      (2006.01)

(56) References Cited

U.S. PATENT DOCUMENTS

| | | | |
|---|---|---|---|
| 2010/0193394 A1* | 8/2010 | Casazza | B65D 61/00 |
| | | | 206/522 |
| 2010/0326268 A1* | 12/2010 | Davis | F03D 80/00 |
| | | | 92/163 |
| 2013/0323007 A1* | 12/2013 | Falkenberg | A45C 11/00 |
| | | | 414/815 |
| 2016/0056755 A1* | 2/2016 | Abiko | H02S 40/10 |
| 2019/0085828 A1* | 3/2019 | Jamund | B08B 3/02 |

FOREIGN PATENT DOCUMENTS

| | | |
|---|---|---|
| DE | 19806400 A1 | 8/1999 |
| EP | 0363751 A2 | 4/1990 |
| EP | 1583905 B1 | 4/2010 |
| GB | 2518701 A | 4/2015 |
| WO | 03048569 A2 | 6/2003 |
| WO | 2004022970 A1 | 3/2004 |
| WO | 2005054672 A1 | 6/2005 |
| WO | 2005087398 A1 | 9/2005 |

OTHER PUBLICATIONS

European Patent Office, International Search Report and Written Opinion in PCT/DK2016/050322, dated Apr. 5, 2017.

* cited by examiner

WIND TURBINE BLADE SURFACE TREATMENT APPARATUS

TECHNICAL FIELD

The invention relates to an apparatus and a method for of applying a surface treatment to the exterior surface of a wind turbine blade, particularly, though not exclusively, for the purposes of cleaning that blade to remove accumulated dirt and the like.

BACKGROUND TO THE INVENTION

The aerodynamic efficiency of wind turbine blades is a key factor that determines how efficiently a wind turbine generator is able to extract energy from a flow of wind. To this end, modern utility scale wind turbines usually have blades whose precise aerodynamic profile is crafted so as to maximise lift along the entire blade length so as to optimise efficiency.

The surface characteristic of a blade is also important in that it should be smooth and uniform so as to maintain laminar airflow across the aerofoil section of the blade to promote good lift characteristics. However, as the wind turbine blade rotates, it will tend to accumulate a layer of dirt which has the effect of reducing the aerodynamic efficiency of the blade. It is therefore desirable that the blades of a wind turbine are cleaned periodically to remove the accumulation of dirt, thereby helping to keep that blade at its peak aerodynamic efficiency.

One approach is described in EP1583905B1 in which an aerial work platform is arranged to encircle the blade and to move vertically with respect to the blade whilst applying a surface treatment to it. In one example, the platform is mounted to the end of an extendable lifting arm that provides positional control over the platform so that it can be moved vertically with respect to the blade under the control of a suitably trained operator. In another example, the platform is coupled to a cable hoist arrangement. In this arrangement, the platform is suspended from a series of cables that depend downwardly from a root end of the blade where they are connected to a frame. Bottom ends of the cables are connected to a stable base, in this case provided by a vehicle. The platform is configured to move up and down along the cables, which act as a guide for the work platform to ensure that it moves along a substantially linear vertical path. Both schemes are complex and likely to be time consuming which extends the total time and also the cost of that maintenance task. In addition, the ring-like structure of the platform results in a cascade of fluid from the platform to the surface below it, and much of this fluid can be considered wasted.

It is against this background that the invention has been devised.

SUMMARY OF THE INVENTION

In a first aspect, embodiments of the invention provide apparatus for treating a surface of a wind turbine blade, comprising an expandable structure that is deployable from a collapsed state into an expanded state in which the structure defines an elongated treatment zone into which a blade is receivable in use. The apparatus includes treating means arranged to apply a treatment in the treatment zone, in a deployed state of the expandable structure.

Beneficially, therefore, the invention provides a particularly convenient means to treat the surface of a wind turbine blade whilst that blade is mounted to the wind turbine. The apparatus does not require complicated hydraulic operating equipment, as is the case in known systems, is readily deployed on site for use, and may be expanded quite rapidly so that the surface treatment can be started quickly. Overall therefore, this speeds up the process of maintaining the surfaces of wind turbine blades, particularly across a wind farm comprising multiple wind turbines. Moreover, since the apparatus is not dependent on complicated hydraulic operating equipment for it to work, it requires fewer skilled operatives which reduces the overall cost of procuring and operating the apparatus. The expandable structure comprises an inflatable structure. The inflatable structure preferably forms the primary load-bearing element of the expandable structure. Hence, the expandable structure is primarily or entirely supported by the inflatable structural elements thereof. Thus, the inflatable structure can be deployed readily by inflating it using suitable inflating means such as an air source like compressed air tanks or an air blower. Hence, along with the expandable structure, the surface treatment apparatus may be primarily supported by the inflatable structure in a deployed condition of the expandable structure. The expandable structure may extend about the elongate treatment zone in a deployed state of the expandable structure and, as such, may be defined by a single inflatable section which is generally annular in form, or a plurality of inflatable sections which, taken together, are arranged such that they extend about the treatment zone and in a direction such that extend along the length of the treatment zone in a deployed state of the expandable structure. Preferably, the treatment apparatus may be configured for treating a blade in a vertical orientation of the same. In embodiments, substantially the entirety of the expandable structure may be comprised of one or more inflatable structural elements. Preferably, the inflatable structure may constitute the primary structural elements of the expandable structure. Preferably, the inflatable structure may constitute the primary load-bearing elements of the expandable structure. Still preferably, the vertical structural elements of the expandable structure may be inflatable structural elements. In embodiments, some radial structural elements of the expandable structure may be non-inflatable. In embodiments, some non-inflatable, radial structural elements of the expandable structure may be flexible, e.g. made from flexible materials. In embodiments, both vertical and radial structural elements of the expandable structure may be inflatable.

The surface treatment means may take various forms but, in one embodiment, the means includes a plurality of treatment heads. These may be configured to apply various treatments to the surface of a blade, an example of which is to spray the blade in the treatment zone with a treatment fluid. Although the treatment heads may be positioned at selected positions along the treatment zone, in one embodiment they are arranged along the length of the treatment zone, in a deployed state of the inflatable structure, to ensure that the surface of the blade receives a substantially simultaneous treatment of fluid. Preferably the weight of the fluid carrying tubes may be carried primarily by the inflatable structure in a deployed state of the same. Treatment sensors may also be comprised within the surface treatment means. Such sensors may for example include optical sensors capable of capturing optical information representing the surface of a wind turbine blade in the vicinity of the treatment apparatus. Temperature sensors capable of indicating the temperature may also be incorporated in the treatment means. Preferably, such sensors may be supported by the inflatable structure. In one embodiment, one or more optical sensors may be associated with a control system capable of signalling when dirt has been removed to a sufficient degree from a blade or when dirt above a predetermined amount, remains on a blade. In one embodiment, one or more temperature sensors may be associated with a control system capable of signalling when a temperature at a given sensor has fallen below a given level. A temperature detected below a given level may give rise to an alarm or may trigger a heating of cleaning fluid being used for e.g. spray-cleaning a blade surface.

Usefully, a fluid delivery system may be provided to supply the treatment heads with a supply of treatment fluid. The fluid delivery system may include fluid carrying tubes that extend within the inflatable structure and so form an integral part of it as the structure is being deployed and collapsed. A fluid delivery system may include a heating device capable of heating treatment fluid being supplied to the treatment means.

A base may be included to provide the expandable structure with a stable platform from which to expand. The base may also act as a sump to collect fluid in the bottom of the structure once the fluid has been applied to the blade.

In another aspect, embodiments of the invention provide a method for treating a wind turbine blade including: positioning a wind turbine blade in a substantially vertical orientation; locating an expandable structure adjacent the wind turbine blade; deploying the expandable structure about the blade by inflating the expandable structure, such that the expandable structure defines an elongated treatment zone which receives at least part of the blade; and applying surface treatment to the surface of the blade using the expandable structure.

The method may involve positioning the expandable structure under the wind turbine blade such that the structure expands upwardly from below a tip of the blade towards the root end of the blade. In this way, the blade is enveloped by the expandable structure in an upwards direction as the structure is deployed. One technique that may be used is to raise the expandable structure by suitable means towards the blade tip before the structure is deployed. In this way the expandable structure starts to cover the blade almost as soon as it is deployed, which means that an expandable structure of a certain size can treat a longer blade compared to a scenario where the expandable structure is deployed from ground level.

In an alternative method, the expandable structure may expand downwardly from the root end of the blade towards a tip end of the blade. Preferably however, the expandable structure may be deployed from at or near ground level using inflatable structural elements.

Expansion of the expandable member may be achieved by inflation by a suitable source of e.g. air, although other gas could be used such as helium. The expandable structure may be inflated to a deployed condition in which the surface treatment apparatus may be primarily supported by the inflatable structure. 16. The method of claims 13 to 15, wherein applying surface treatment to the blade includes spraying the surface of the blade with a surface treatment fluid. Surface treatment fluid may be applied to a blade surface using the treatment means from a supply of treatment fluid. If required, a heating apparatus may heat the treatment fluid. In aspects, heat treatment fluid may be heated by a heating apparatus in response to signals from temperature sensors. In particular, a heating action may be triggered by an output from a control device associated with a temperature sensor, which may be a temperature sensor of the treatment apparatus. By way of example, a detected temperature drop below a predetermined threshold level, stored in a memory of the control device of the temperature sensor, may give rise to activation of a heating apparatus for the treatment fluid. The method may further include recycling the surface treatment fluid that has been sprayed onto the surface of the blade.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that matter.

BRIEF DESCRIPTION OF THE DRAWINGS

In order for the invention to be more fully understood, it will now be described by way of example only with reference to the following drawings, in which.

DETAILED DESCRIPTION OF EMBODIMENTS OF THE INVENTION

Figure 1:
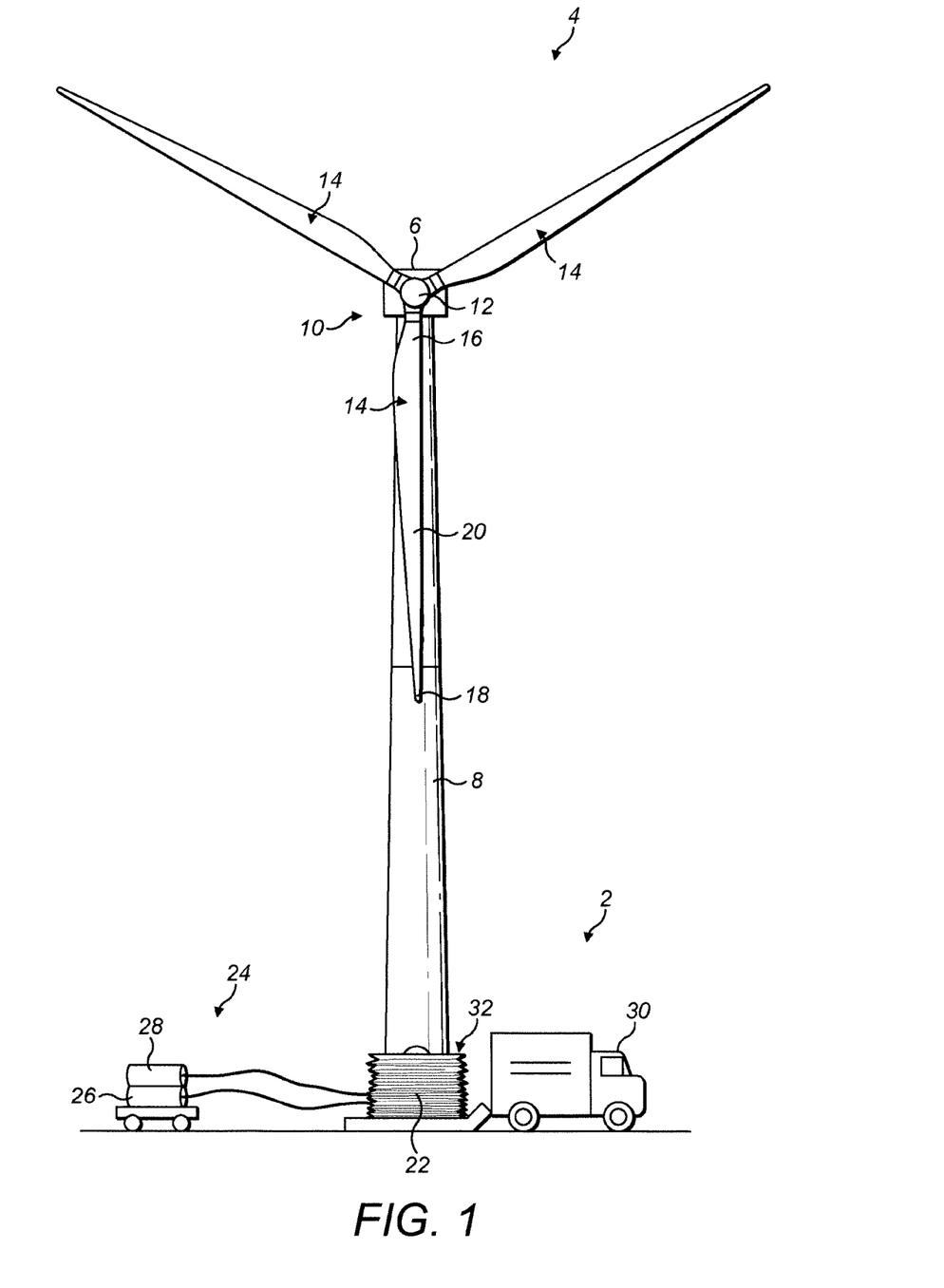
FIG. 1 is a front view of a wind turbine, near to which is located a surface treating apparatus in accordance with an embodiment of the invention, where the surface treating apparatus is shown in a stowed state.

With reference to FIG. 1, a surface treating apparatus 2 in accordance with an embodiment of the invention is shown positioned in front of a wind turbine 4.

The wind turbine 4 in this example is a horizontal-axis wind turbine (HAWT) which includes a nacelle 6 mounted on top of a tower 8. The nacelle 6 supports a rotor 10 including a hub 12 and three blades 14. Each blade has a root 16, a tip 18 and an aerodynamic outer surface 20, although only one of the blades 14 is labelled with these features for brevity.

The wind turbine 4 in FIG. 1 is depicted in a 'maintenance position' in which the rotor is set in a position such that one of the blades 14 is pointing straight downwards, that is to say in the six o'clock position, or 'Y position'. This allows the surface treating apparatus 2 to engage the vertically-oriented blade 14, as will be explained. For the purposes of this description, the surface treating apparatus 2 is configured to clean the surface of the blade 14. As such, it can be considered to be a blade cleaning apparatus, or system, and may be referred to as such from now on.

The blade cleaning apparatus 2 comprises an expandable structure 22 that is configurable between stowed and deployed states. In FIG. 1, the expandable structure 22 is shown in a stowed state such that it is positioned adjacent the blade 14, directly underneath the tip 18. As will be explained, when deployed, the expandable structure 22 extends from the stowed position and rises up towards the blade 14 so that it envelops the outer surface of the blade along at least a portion of its length. Once deployed, the expandable structure 22 can be used to apply a selected surface treatment to the blade, which could be for the purposes of cleaning the blade, for example, although other processes are also envisaged.

In the illustrated embodiment, the expandable structure 22 is inflatable which allows for a relatively space-efficient and light-weight package when in a stowed configuration. Suitable means to inflate the expandable structure 22 is provided by a service module 24 which comprises at least inflating means 26, for example in the form of an air compressor or alternatively, compressed air tanks, although another gas may be used such as a gas having a density comparable to the surrounding air at the turbine site, or a gas having a different density, for example helium. In embodiments where the inflatable structure 22 is used to clean the blade 14 with a suitable fluid, the service module 24 may also comprise a suitable fluid pumping means 28, for example comprising a fluid pump and a fluid tank.

Due to the size and weight of the stowed expandable structure, it may be manoeuvred into position by a vehicle 30 such as a small truck or lorry. However, it is envisaged that the expandable structure 22 could be configured into a semi-permanent fixing adjacent the foot of the tower 8 and be housed with a suitable weather-proof container. Similarly, although the service module 24 is shown as a mobile unit in FIG. 1, it could also be provided as a more permanent installation. Currently, a mobile blade cleaning apparatus 2 is considered particularly useful since a single apparatus could be moved between different wind turbines for blade cleaning which would be less costly than providing each wind turbine with a dedicated on-site installation.

In order that the blade can be cleaned efficiently and thoroughly, the expandable structure 22 should extend about the blade 14 as it is deployed. To this end, in this embodiment the expandable structure 22 is cylindrical or tube-like in form, and is hollow so that it defines a central chamber 32. The central chamber 32 thus defines a 'treatment zone' within which the blade 14 can be received and where a surface treatment can be applied to the blade, as will be explained.

Figure 2:
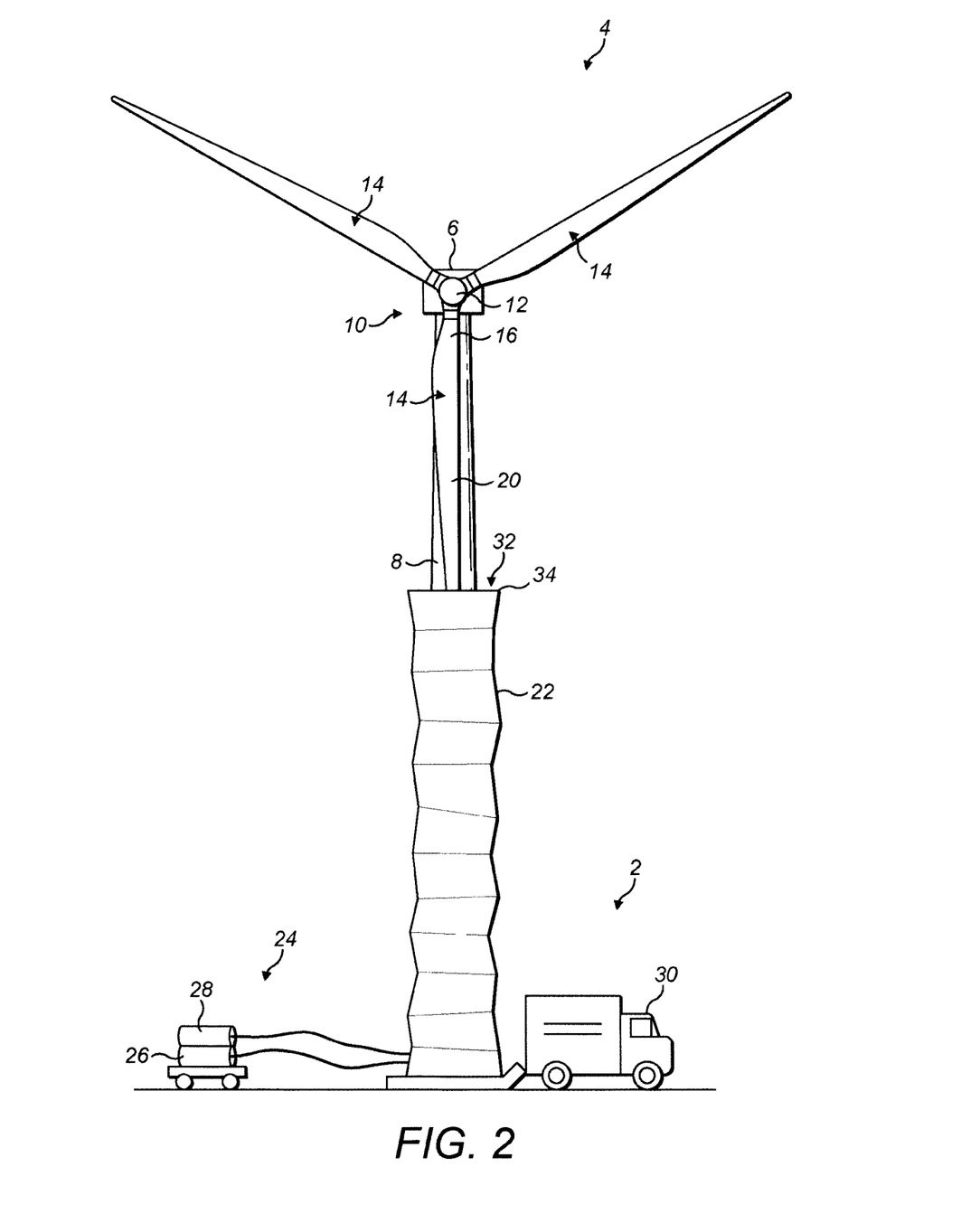
FIG. 2 is a view of the wind turbine in FIG. 1, but which shows the surface treating apparatus in a partially deployed state.
Figure 3:
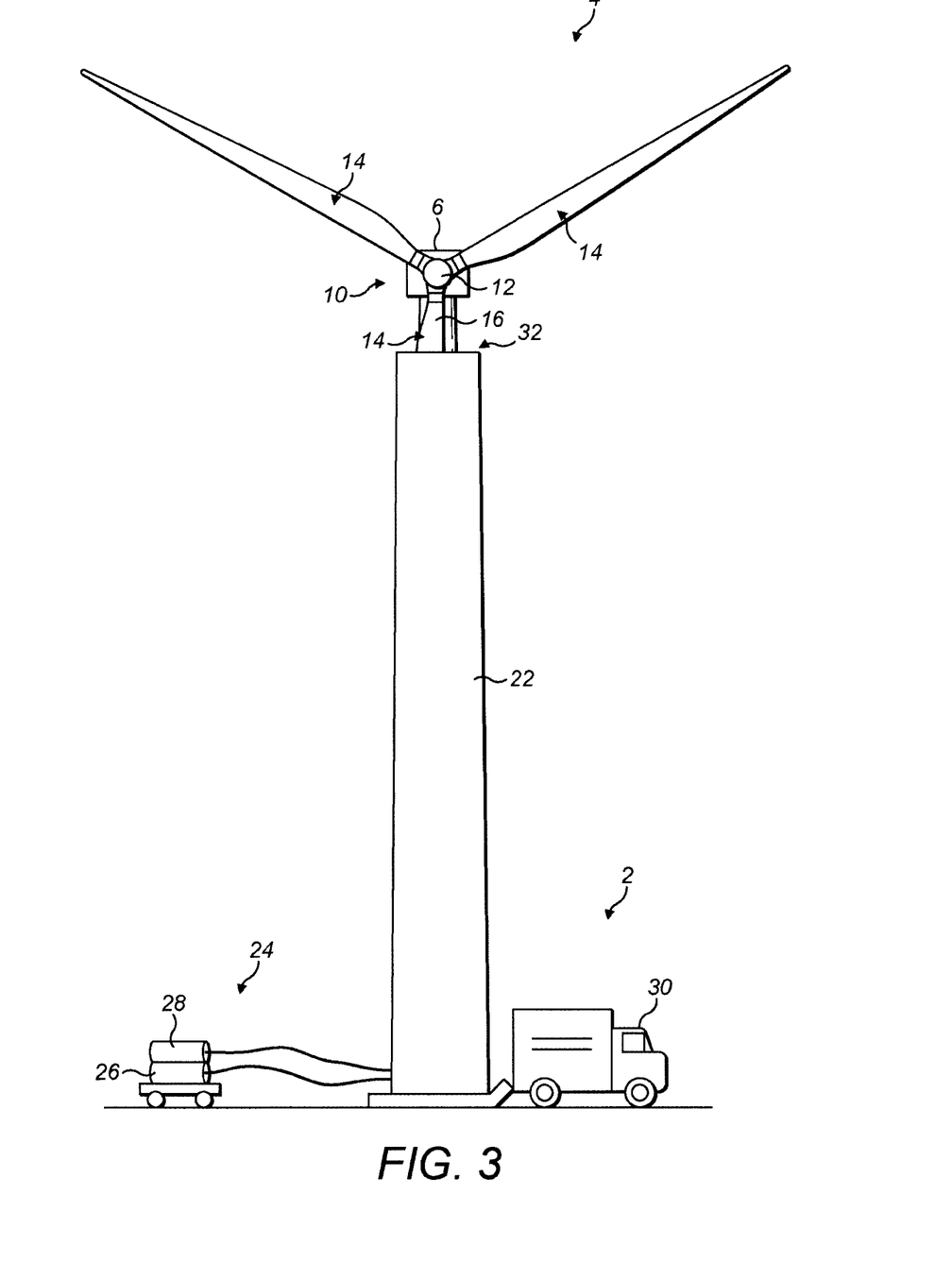
FIG. 3 is a view of the wind turbine in FIGS. 1 and 2, but which shows the surface treating apparatus in a fully deployed state.

Turning to FIGS. 2 and 3, the expandable structure 22 is shown being inflated so that the blade 14 is received into the treatment zone 32 which, when deployed, is elongated so as to be substantially similar in size to the blade. FIG. 2 illustrates the expandable structure 22 partially inflated so that its leading edge 34 has passed the blade tip 18 and is rising up the radially outer part of the blade 14, whereas FIG. 3 shows the expandable structure 22 fully deployed so that the leading edge 34 of the structure 22 extends up to be near the root 16 of the blade 14. In this way, substantially the entire length of the blade 14 is received in the treatment zone 32 and, as such, substantially the entire outer surface of the blade 14 can be treated. From the deployed position shown in FIG. 3, the structure 22 may be collapsed so that it resumes the stowed form shown in FIG. 1. This allows the structure 22 to be re-packed into the vehicle 30 ready to be moved to another site.

It should be noted at this point that FIGS. 1 to 3 provide a stylised view of the expandable structure 22 as a means of illustrating its general principle of operation. For a deeper understanding of the blade cleaning apparatus 2, it will now be described with reference to FIGS. 4, 5 and 6 which show the expandable structure 22 in more detail.

As has been mentioned above, the expandable structure 22 is configured generally as a tall hollow tube, sleeve or cylinder having a generally cylindrical side wall 40, a closed lower end 42 defined by a base 44, and an open upper end 46 which defines an opening 50 into the treatment zone 32. Optionally, the structure 22 may be provided with a slightly tapered profile, such that it tapers inwardly from its base 44 to its upper opening 50, which is shown in FIG. 3.

The side wall 40 is hollow and as such comprises radially inner and outer wall portions 40a, 40b that define an annular air-inflatable cavity or chamber 45 (best seen in FIG. 6) that extends about the treatment zone 32. In this embodiment, it is the side wall 40 that provides the expandable structure 22 with the majority of its strength so it can remain upright when inflated and in use. The side wall 40 may be any suitable material that is flexible, relative light weight to minimise stress on the structure 22 when inflated, yet durable enough to withstand the internal pressure due to inflation, to avoid damage due to puncturing or tearing, but also to resist exposure to UV light. It is envisaged that a suitable material would be a flexible waterproof treated fabric as used to manufacture bouncy castles and aircraft escape chutes. As an example, a suitable material could be polyurethane (PU) or polyvinylchloride (PVC) coated nylon, having a weight in the region of 600 gsm or more. However, the skilled person would be aware that other materials would also be suitable.

Figure 4:
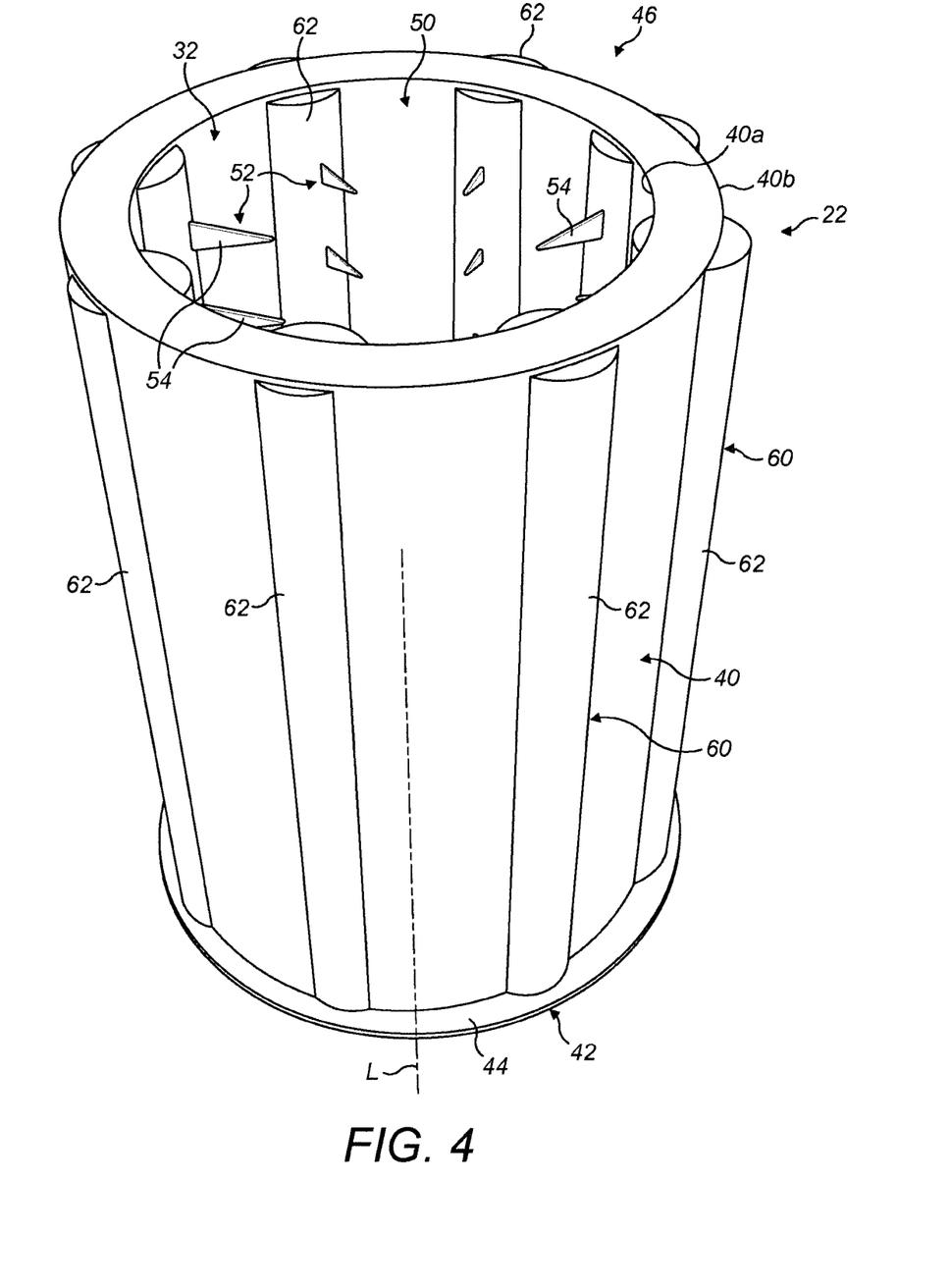
FIGS. 4, 5 and 6 are various views of the surface treating apparatus which is shown stylised in FIGS. 1 to 3.
Figure 5:
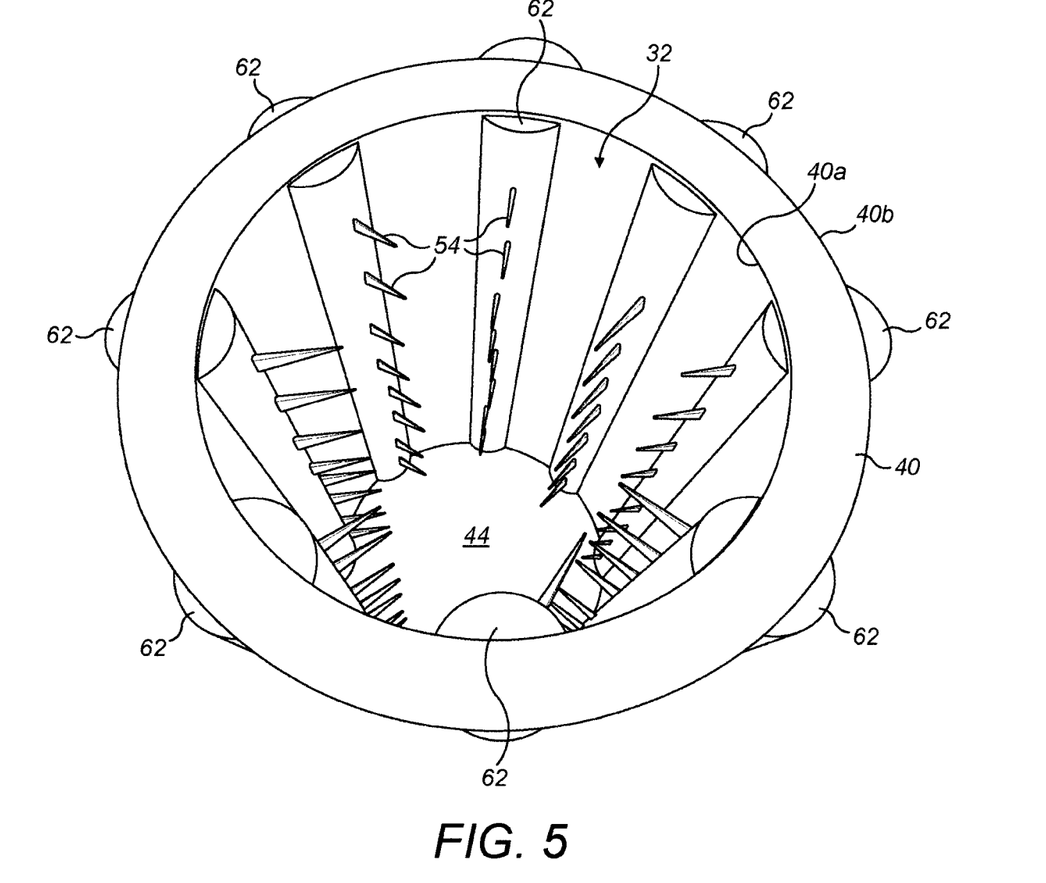
Figure 6:
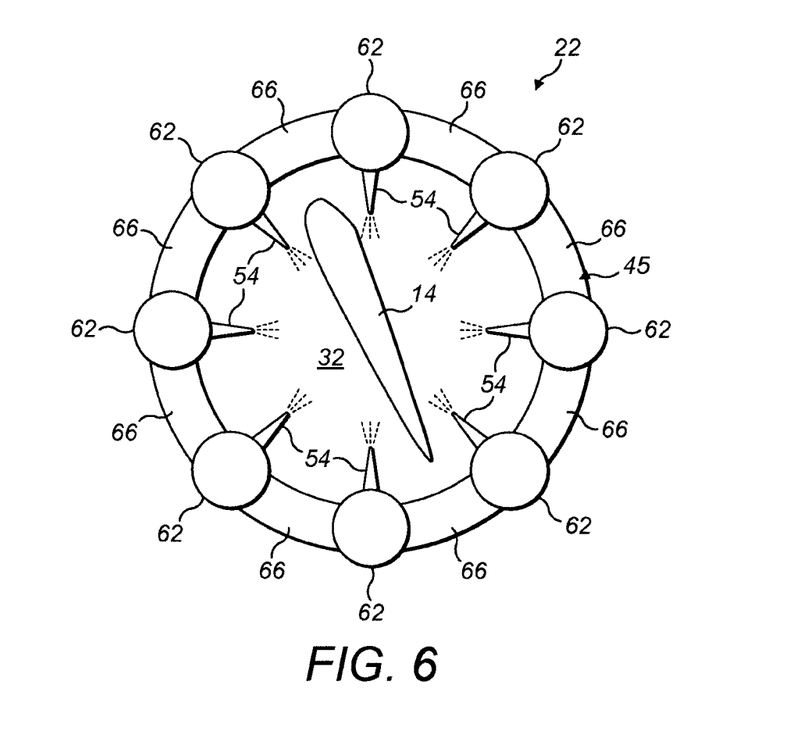

It should be mentioned at this point that FIGS. 4, 5 and 6 are not to scale and so the relative height of the structure 22 compared to its diameter are not necessarily true to life. However, it is envisaged that a realistic height for the structure would be between 40 m and 60 m metres, the diameter may be between 2 m and 4 m, whilst the wall thickness may be in the region of 15 cm and 40 cm. Any suitable compressed air (or other gas) source could be used to inflate the expandable structure 22, although a motorised compressor or blower is considered particularly suitable. It is envisaged that inflating the expandable structure to a pressure of approximately 3 psi (pounds per square inch) would provide sufficient structural strength, although this pressure value is given by way of example only.

It is also envisaged that the height of the structure may be much higher than 60 m so that the blades of taller wind turbines may be treated having blade lengths in excess of 80 m. In such circumstances, expandable structures with heights in excess of 100 m would be possible as they could be supported by one or more guy lines which would provide support to the structure at a plurality of points along the length of the structure.

An additional or alternative option would be to raise the base of the structure on a movable platform, for example on a hydraulic lift platform, to a point where it is positioned just underneath the tip of the blade to be treated.

As can be seen, the treatment zone 32 extends along the length of the expandable structure 22 and is dimensioned to accommodate the cross section of a wind turbine blade 14, as is shown particularly clearly in FIG. 6. As the structure 22 extends about, or encircles, the blade 14, it provides a protective environment for the application of a surface treatment by way of treatment means 52 that is integrated into the structure 22. The structure 22 therefore functions like a sleeve, cage or shell that envelops the blade as it expands upwardly.

In a broad sense, the treatment means 52 may be any arrangement that applies a treatment to the surface of the blade 14. For example, the treatment means 52 may include brush-like agitators that are configured to scrape the surface of the blade 14 in order to remove accumulated deposits, or also may include air nozzles to dry a moist surface, for example if it has been pre-treated with paint or some other surface finish. However, in this embodiment, the treatment means 52 is configured to spray a treatment fluid onto the surface of the blade 14. To clean the blade, the treatment fluid may be a cleaning agent formulated to break down and remove dirt deposits. However, the fluid may also perform other functions, such as de-icing, painting, crack filling, curing, surface finishing, lacquer application and so on.

In the illustrated embodiment, the treatment means 52 is embodied by a plurality of spray nozzles 54 (only some of which are labelled, for brevity) arranged in a radial spacing about the blade 14 so as to so to direct a spray of fluid radially inwards towards the centre of the treatment zone 32 where the blade 14 is located. As has been mentioned, the expandable structure 22 may be particularly useful for cleaning the blade 14, in which case cleaning fluid used on the blade is free to fall downwards under the influence of gravity so as to collect in the base 44 of the structure 22, which therefore acts as a sump. In some embodiments, it is envisaged that the fluid collected at the base 44 can be drawn off, filtered, and then used again.

A fluid delivery system 60 is provided to delivery fluid to the nozzles 54. Preferably, the fluid will be provided at a suitable pressure that the fluid leaving the nozzles 54 is effectively dispersed so that it strikes the blade surface 20 in a reasonably uniform manner. In the illustrated embodiment, the fluid delivery system 60 comprises a plurality of fluid carrying tubes 62 that are incorporated into the side wall 40 of the inflatable structure. Although in principle any number of tubes are possible, here there are eight fluid delivery tubes 62 that are distributed around the side wall 40 with a substantially equal angular spacing.

The fluid delivery tubes 62 are oriented to extend longitudinally along the expandable structure 22 such that they are parallel to its major axis 'L'. Although this is not essential, it is currently envisaged that this configuration will be most simple in terms of fabrication. However, in principle the fluid delivery tubes 62 could be arranged so that they extend at an angle to the major axis L of the structure 22, for example so as to define a helical path that in effect 'wraps around' the structure 22.

Each of the fluid delivery tubes 62 carries several of the nozzles 54, and each of those nozzles 54 in the group are vertically aligned on a radially inner surface of a respective tube 62 and point in a direction towards the centre of the treatment zone 32. It is envisaged that the nozzles 54 will be integral to the fluid delivery tubes 62 and therefore made out of the same flexible material. Likewise, it is envisaged that the fluid delivery tubes 62 will be the same material as the side wall 40, so that the side wall 40, fluid delivery tubes 62 and nozzles 54 can be manufactured from the same flexible fabric material and inflated as a single article.

The diameter of the fluid delivery tubes 62 in the illustrated embodiment is slightly larger than the thickness of the side wall 40 of the structure 22 within which they are integrated and, as such, portions of the fluid delivery tubes 62 protrude a little from the inner and outer surfaces 40a,40b of the side wall, like a rib. Sizing the fluid delivery tubes 62 in this way in effect causes the annular chamber 45 of the side wall 40 to be partitioned into a plurality of inflatable sections 66, each of which is interspaced between a pair of delivery tubes 62. In some embodiments, the structure 22 is configured such that each of the inflatable sections 66 is in isolation, that is to say they are not in fluid communication with one another. As such, each inflatable section 66 must be inflated separately. One advantage of this is that the air pressure within each inflatable section 66 can be controlled individually, which may enable the rigidly of the side wall 40 to be controlled by controlling the inflation pressure of the inflatable sections 66. In other embodiments, however, air passageways (not shown) may be provided between the inflatable sections 66 so that each of the section 66 is linked and so inflates at the same rate and at the same pressure.

In use, fluid pumping means 28 pumps fluid into the fluid delivery tubes 62 so that they fill with fluid. As a result, fluid is ejected from the outer ends of the nozzles 54 in a fine spray towards the blade 14. It should be appreciated that the nozzles 54 may be suitably configured to vary the spray form from the nozzles 54. For example, a small exit hole could be provided to result in a finer spray and, conversely, a larger hole could be provided to result in a more concentrated and directional spray form.

Figure 7:
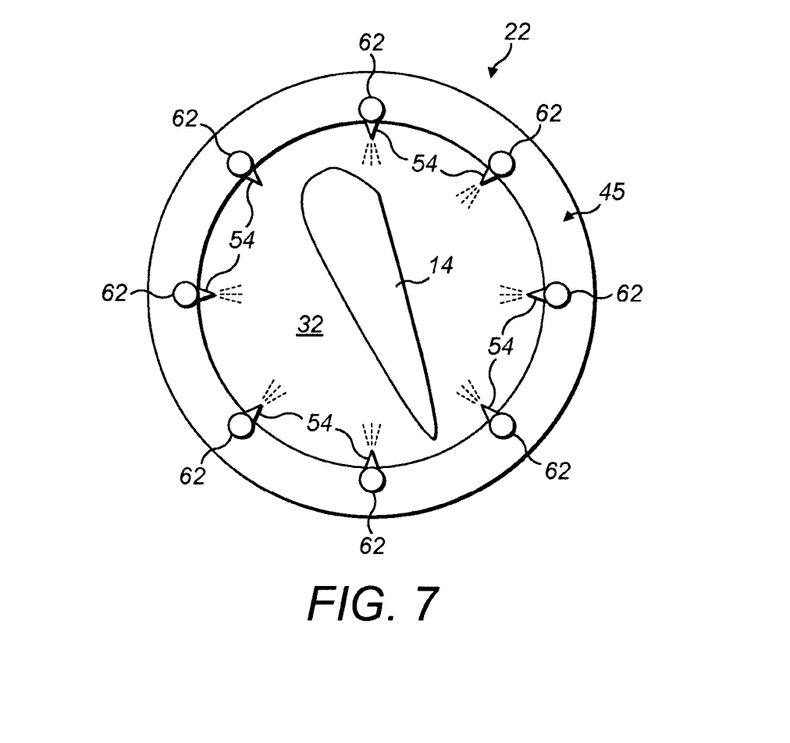
FIG. 7 is a section view, like that in FIG. 6, showing an alternative embodiment.

In a variation on the current embodiment, it is envisaged that fluid delivery tubes 62 could be configured to be narrower than those shown in FIGS. 4-6. This would reduce the volume of fluid required to fill the fluid delivery tubes 62, meaning that less fluid would be needed to fill the tubes and activate the spray nozzles, and which would reduce the weight of the fluid in the tubes, in use. This could beneficially result in less stress on the inflatable structure. One way in which this could be embodied is shown in FIG. 7. In this embodiment, it will be noted that the diameter of the individual fluid delivery tubes 62 is less than the thickness of the side wall 44 such that they do not cross the width of the annular chamber 45. This means that the annular chamber 45 is a single volume rather than being defined by separate inflatable sections 66 as in the previous embodiment.

As an alternative to built-in fluid delivery tubes 62 that form an integral part of the fabric of the expandable structure, it is envisaged that in an alternative embodiment the nozzles 54 could be supplied with fluid via a network of hoses (not shown), each hose configured to supply a single nozzle or a group of nozzles. It will further be appreciated that in this embodiment the diameter of the fluid delivery tubes 62 is significantly less than the thickness of the side wall 40 meaning that the annular chamber 45 is a single volume that can be considered to be a single inflatable section extending radially about the treatment zone 32 rather than a plurality of inflatable sections 66 as in the previous embodiment.

With respect to the specific embodiments described above, the skilled person will understand that they may be modified in such a way that would not depart from the inventive concept, as defined by the claims. Some variants on those specific embodiments have already been described, but some further options will now be explained below.

In the illustrated embodiments, the fluid delivery system 60 includes a plurality of longitudinally-extending tubes 62 that are filled with fluid, in use, to activate the spray nozzles 54. Whilst the fluid delivery tubes 62 convey the fluid to the nozzles 54, the side wall 40 carries the weight of the structure 22 by way of its annular chamber 45 being inflated at a suitable pressure. However, other embodiments are envisaged which do not involve inflation of the side wall in this way, and FIG. 8 illustrates one example of this.

Figure 8:
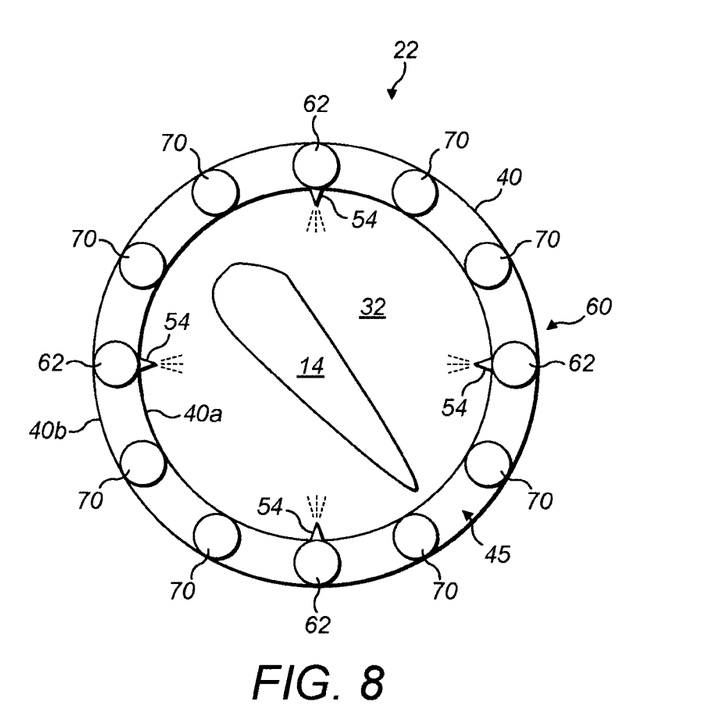
FIG. 8 is a section view, like that in FIGS. 6 and 7, showing an alternative embodiment.

In the embodiment of FIG. 8, in which the same reference numerals are used to refer to the same or similar parts as in the previous embodiments, the inflatable structure 22 includes an open-ended cylindrical side wall 40 which defines a central treatment zone 32, and a plurality of spray nozzles 54 which are associated with a fluid delivery system 60 in the form of a plurality of fluid carrying tubes 62 that extend longitudinally along the side wall 40.

In this case the fluid delivery system 60 includes four fluid delivery tubes 62, which are located in mutually orthogonal positions about the side wall 40, that is to say, in three, six, nine and twelve o'clock positions when viewed from above. However, the strength of the structure 22 is provided by a plurality of air-inflatable members 70 which, in this embodiment, are also in the form of tubes, much like the fluid delivery tubes 62. Thus, it will be appreciated that the air-inflatable members 70 are equivalent to the inflatable sections 66 as described with reference to the previous embodiment.

In this embodiment, therefore, the annular chamber 45 defined by the side wall 40 of the structure 22 may not necessarily be inflated, and as such the inner and outer side wall portions 40a,40b could be made from a lighter weight material, even a mesh-like fabric, which could reduce the overall weight of the structure. In such a case, the side wall 40 would act simply to retain the tubes 62 and members 70 in fixed relative positions. One benefit of this arrangement is that if the side wall 40 is formed from a relatively open material such as a mesh or net, this may reduce the force acting on the structure 22 due to wind flowing through and past the structure 22.

The option remains to inflate the annular chamber 45, thereby providing further strength to the structure 22, which may be useful in windy conditions, and may provide a backup to the air-inflatable members 70 in the event that one or more of the members 70 deflates accidentally. Usefully in this embodiment, the side wall 40 is retained and provides a substantially closed treatment zone 32 which provides some protection for the blade 14, but also means that fluid sprayed from the nozzles 54 can be retrieved from the base 44 and recycled.

Figure 9:
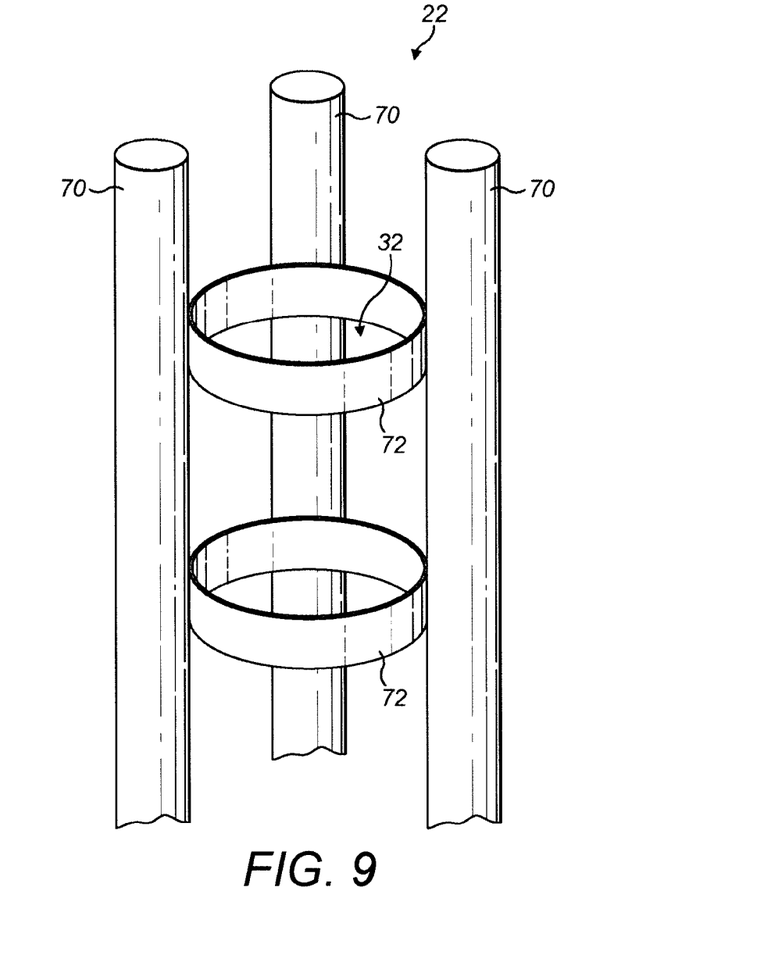
FIG. 9 is a perspective view illustrating a further alternative embodiment.

A development of the FIG. 8 embodiment is shown schematically in FIG. 9. In this embodiment, the air-inflatable members 70 are connected by a series of harness rings 72, which are circular in this embodiment, but could be different forms, that hold the air-inflatable members 70 in fixed relative positions. It will be appreciated therefore that the curtain-like side wall 40 of the previous embodiment is omitted in this embodiment and, as such, the air-inflatable members 70 resemble a truss-like or space-frame structure. Although not shown here, the harness rings 72 may support a fluid delivery system and associated nozzles in a similar manner to the previous embodiments, for example as longitudinally-extending fluid delivery tubes having accompanying spray nozzles, or as a network of hoses.

Figure 10:
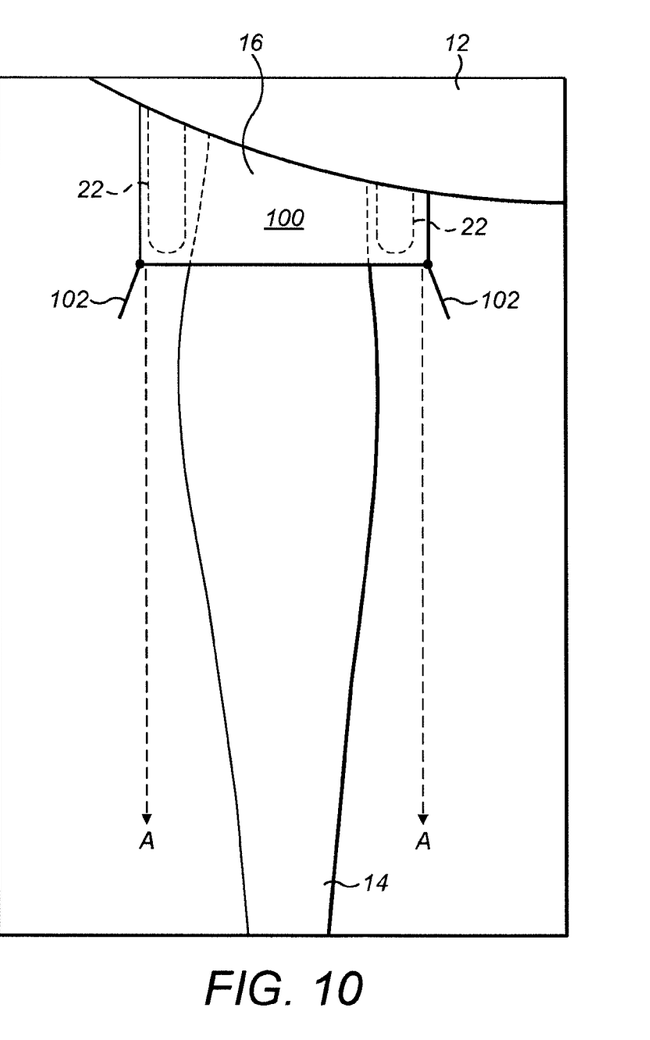
FIG. 10 is a schematic view of a further alternative embodiment.

In all of the above embodiments, the expandable structure 22 is located on the ground and expands upwardly towards and around the blade 14 thereby receiving the blade 14 within the treatment zone 32. However, other embodiments are envisaged to which the same principle is applied, albeit that the expandable structure 22 depends downwardly, from the root of a blade to its tip. One such embodiment is shown in FIG. 10, although it should be appreciated that this is a schematic view so as to demonstrate the principle rather than a fully realised working diagram.

In this embodiment, the expandable structure 22 is located in an annular housing 100 that is located at a junction between the hub 12 of the wind turbine and the root 16 of the blade 14. As can be seen, the housing is openable by doors 102 which permits the expandable structure to expand downwards, as indicated by arrows 'A' so that is covers a significant length of the blade. Although inflating the expandable structure 22 is an option, in which the inflation equipment may be housed within the hub 12 of the wind turbine, it is also an option that the expandable structure 22 could be allowed to expand downwards under its own weight, simply under the influence of gravity. In such a case, suitable ballast (not shown) could be provided at the radially outer end of the expandable structure to help it expand to its full length.

The invention claimed is:

1. A method for treating a wind turbine blade including:
positioning a wind turbine blade in a substantially vertical orientation;
locating an elongated expandable structure adjacent the wind turbine blade wherein the elongated expandable structure comprises an inflatable structure, the elongated expandable structure being primarily or entirely supported by the inflatable structure, wherein the elongated expandable structure further comprises:
a side wall;
a plurality of fluid delivery tubes spaced around the side wall and each of the plurality of fluid delivery tubes extending along a lengthwise direction of the elongated expandable structure; and
a plurality of nozzles vertically positioned on a radially inner surface of each of the plurality of fluid delivery tubes;
deploying the elongated expandable structure about the blade such that the elongated expandable structure defines an at least partially enclosed elongated treatment zone which receives at least part of the blade wherein deploying the elongated expandable structure includes inflating the inflatable structure;
pumping fluid into each of the plurality of the fluid delivery tubes and into each of the plurality of nozzles; and
treating the surface of the blade by ejecting fluid from the plurality of nozzles towards the surface of the blade.

2. The method of claim 1, wherein the elongated expandable structure is positioned under the wind turbine blade such that the elongated expandable structure expands upwardly from below a tip of the blade towards a root end of the blade.

3. The method of claim 1, wherein the elongated expandable structure is incorporated in a housing adjacent a root end of the blade, and wherein the elongated expandable structure expands from the root end of the blade towards a tip end of the blade.

4. The method of claim 1, wherein treating the surface of the blade includes spraying the surface of the blade with a surface treatment fluid.

5. The method of claim 4, including heating a surface treatment fluid.

6. The method of claim 5, including recycling the surface treatment fluid that has been sprayed onto the surface of the blade.

7. The method of claim 6, including extracting used surface treatment fluid from a sump of the elongated expandable structure.

* * * * *